Figure 1:
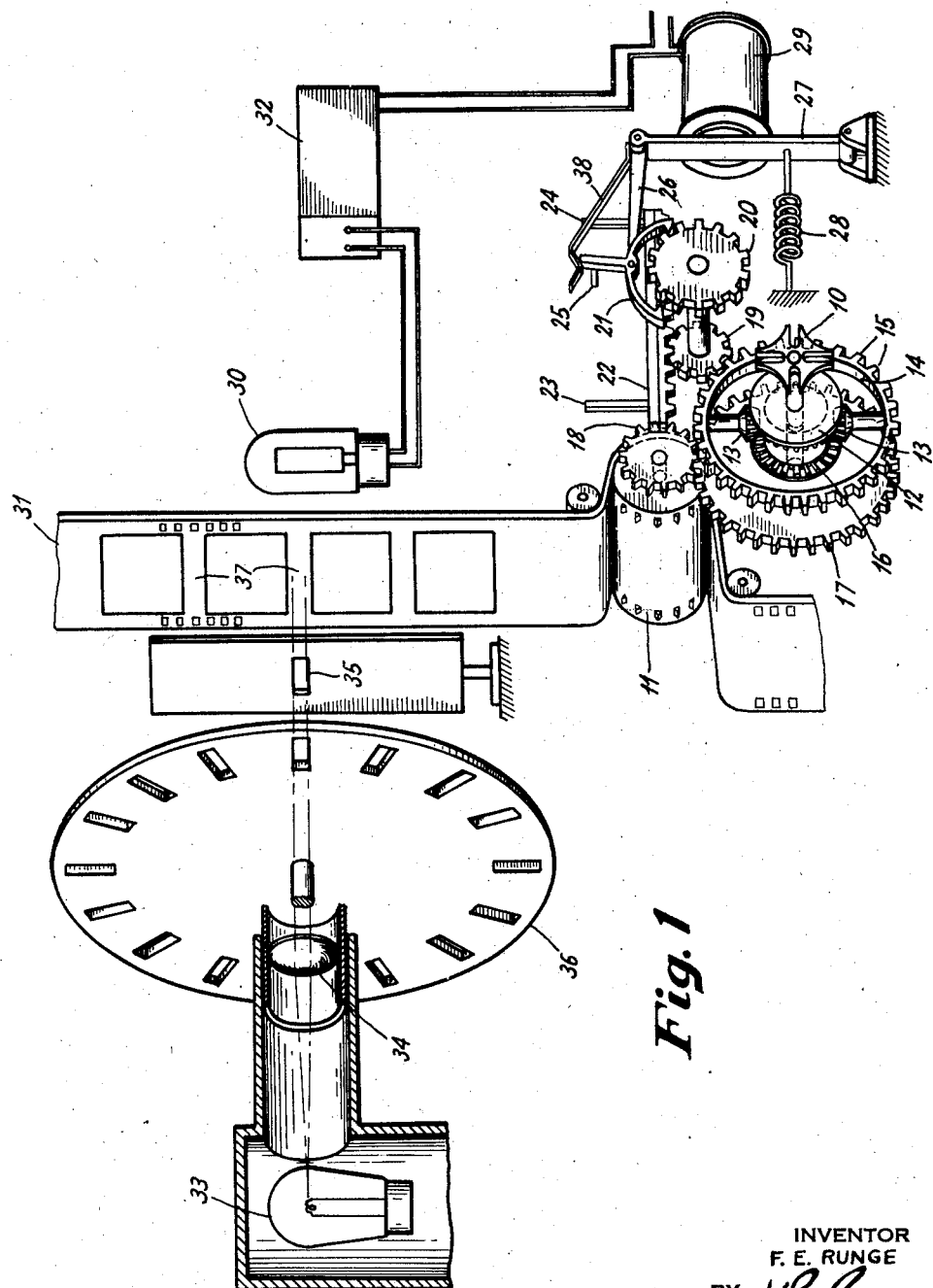

March 12, 1940.   F. E. RUNGE   2,192,987
MOTION PICTURE FRAMING DEVICE
Filed Nov. 12, 1935   2 Sheets-Sheet 1

INVENTOR
F. E. RUNGE
BY
ATTORNEY

March 12, 1940.  F. E. RUNGE  2,192,987
MOTION PICTURE FRAMING DEVICE
Filed Nov. 12, 1935  2 Sheets-Sheet 2

INVENTOR
F. E. RUNGE
BY
ATTORNEY

Patented Mar. 12, 1940

2,192,987

UNITED STATES PATENT OFFICE 2,192,987

MOTION PICTURE FRAMING DEVICE

Frank E. Runge, Oaklyn, N. J., assignor to Radio Corporation of America, a corporation of Delaware Application November 12, 1935, Serial No. 49,341

5 Claims. (Cl. 88—17)

This invention relates to mechanisms for framing motion pictures and the like and has for its principal object the provision of an improved framing device and method of operation whereby a motion picture is automatically reframed in response to its movement into an out-of-frame position.

In the operation of motion picture taking and projecting apparatus, it is customary to move a photographic film in steps which are equal in length to the height of one picture frame and which are separated by time intervals during which the film is maintained stationary for exposing the negative film to the picture scene or projecting the picture image of the positive film. This intermittent movement of the film is usually produced by means of a sprocket which is mechanically coupled to the intermittently moving member of a Geneva cross mechanism or the like. Under these conditions, the length of film moved through the picture gate during any given interval of time is dependent on the spacing of the film sprocket holes and may vary considerably because of unequal film shrinkage and the like. Such variation results in displacement of the picture frames with respect to the aperture through which they are exposed or projected.

Such displacement of the picture frames is usually corrected by operation of a mechanism through which the intermittent sprocket and its drive mechanism are moved along the film path, by operation of conical film driving rollers which are adjusted to vary the diameter of the frictional driving surface presented to the film or by operation of similar mechanisms adapted to effect longitudinal adjustment of the film with respect to the picture aperture.

These various types of film position adjusting mechanisms may be operated either manually or automatically in response to movement of the picture frames into an out-of-frame position. Insofar as applicant is aware, however, their operation involves longitudinal movement of comparatively heavy parts or the use of other features which are not altogether satisfactory from a practical viewpoint. In accordance with the present invention, this difficulty is avoided or minimized by the provision of an improved film position adjusting mechanism including a framing mechanism which is interposed between the film drive sprocket and the intermittent drive member and which is operated in response to movement of the picture frames into an out-of-frame position.

The invention will be better understood from the following description when considered in connection with the accompanying drawings, and its scope will be pointed out in the appended claims.

Figure 2:
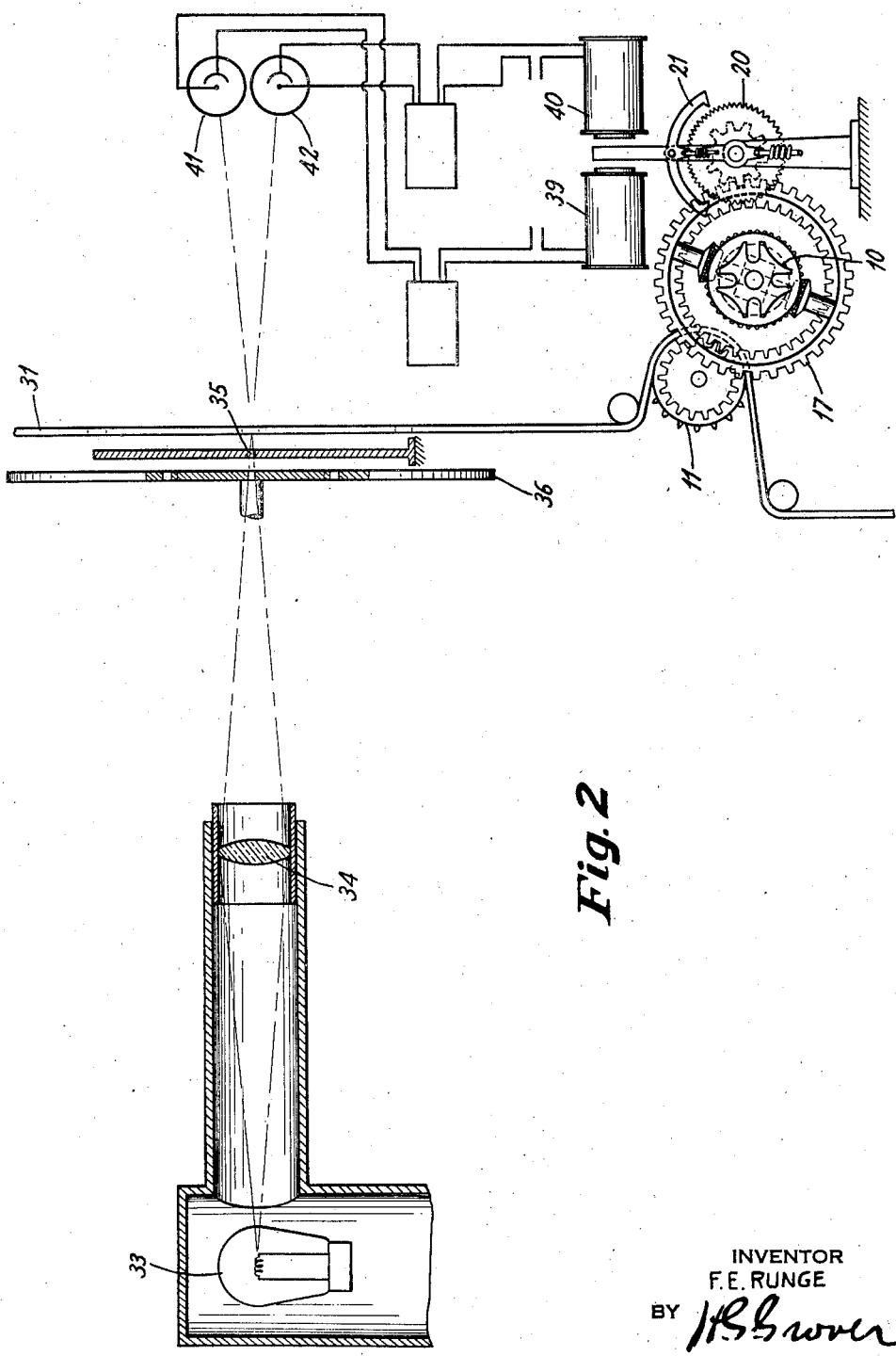

Referring to the drawings:

Fig. 1 is a perspective view illustrating the improved framing mechanism and its associated parts, and Fig. 2 illustrates a similar but slightly modified form of the invention.

The apparatus of Fig. 1 includes the intermittently moved Geneva cross member 10 and the usual intermittent mechanism, the remainder of this mechanism being omitted for the sake of clearness. Driven by the member 10 is an intermittent sprocket 11 to which the member 10 is mechanically coupled through a planetary gear mechanism including a gear 12 mounted on the shaft of the intermittent member 10, gears 13 mounted on a carrier 14 provided at its periphery with gear teeth 15 and a gear 16 which cooperates with the gears 13 and is fixed to a gear 17 which drives a gear 18 fixed to the shaft of the sprocket 11.

Associated with the gear 15 at the periphery of the carrier 14 is a gear 19 fixed to the same shaft as a gear or ratchet 20 cooperatively associated with a pawl 21. It should be noted that the gear 19 also cooperates with a rack 22 provided with pawl control members 23 and 24 which are adapted to cooperate with a pin 25 mounted on an extension of the pawl 21. The pawl 21 is supported at the end of a lever 26 fastened at one end to a standard 27 which tends to be maintained in one position by a spring 28 moved to another position in response to energization of a solenoid 29. Energization of the solenoid 29 is controlled through a photocell 30 mounted at one side of a film 31 which is moved intermittently by the sprocket 11, the current of the photocell being supplied through an amplifier 32 to the solenoid. Light from a lamp 33 is projected, is passed to the film 31 through a lens 34, a light slit 35 and a periphery disk 36 which is rotated in synchronism with the intermittent drive mechanism.

In the operation of the framing mechanism, light from the lamp 33 is excluded from the photocell 30 by the opaque frames 37 of the pictures so long as the pictures are properly framed with respect to the picture gate or aperture (not shown). Movement of the film 31 into an out-of-frame position, however, permits light to pass one side or the other of the frame 37 to the photocell 30. Under these conditions, the solenoid 29 is energized and the carrier 14 is moved in a manner to impart to the sprocket 11 additional movement whereby the pictures are moved back into-frame with the picture aperture. Thus, if the film is assumed to be moving downwardly and the frame 37 moves to the position where light is projected past it into the photocell 30 during the period of picture dwell the solenoid 29 operates to move the member 27 to the right. This member is subsequently moved to the left by the spring 28 and the ratchet 20 operates through gears 19, 15, 13, 16, 17 and 18 to retard the film movement produced by the intermittent drive mechanism.

The limit of this retarding movement is determined by the position of the stop 24 of the rack 22. When this stop moves into contact with the pin 25 the pawl 21 is rotated under the bent end of a spring 38 which maintains it in such a position that energization of the solenoid 28 accelerates instead of retards the movement of the film 31. The limit of this accelerating movement, however, is determined by the stop 23 of the rack 22 which operates to move the pin 25 and pawl 21 into their illustrated position after the film has been adjusted through a predetermined distance.

The apparatus of Fig. 2 differs from that of Fig. 1 in that the pawl and ratchet mechanism 20—21 is modified to permit the use of a pair of solenoids 39 and 40 which are independently controlled by photocells 41 and 42 displaced from one another to receive light transmitted past opposite sides of the picture frame. The provision of this modified pawl and ratchet mechanism, of course, obviates the need of the rack 22 and the spring 28, which are omitted from this embodiment of the invention. This modification of the invention is substantially the same as the modification illustrated by Fig. 1 and will be apparent in view of the previous explanation. It will be observed that in both cases the intermittent member 10 is arranged to rotate about a fixed axis, the aperture disk 36 is rotated synchronously with the intermittent member and the framing mechanism is interposed between the intermittent member 10 and the film drive sprocket 11. This construction has the advantage of simplicity in structure, is comparatively inexpensive and is readily maintained in satisfactory operating condition.

I claim:

1. The combination of an intermittently rotatable member, a motion picture film driving sprocket, and a picture framing mechanism including a planetary gear assembly interposed between said member and said sprocket, a pawl and ratchet arranged to drive said assembly, and electrical means intermittently actuated by the film and operable to actuate said pawl and ratchet in response to movement of said film into an out-of-phase position.

2. The combination of an intermittently rotatable member, a motion picture film driving sprocket, and a picture framing mechanism including a planetary gear assembly interposed between said member and said sprocket, a pawl and ratchet arranged to drive said assembly, and means including a light responsive device adapted to be intermittently illuminated by light passing through the film in an out-of-frame position and operable to control the operation of said pawl and ratchet in accordance with the position of said film.

3. The combination of an intermittently rotatable member, a motion picture film driving sprocket, and a picture framing mechanism including a planetary gear assembly interposed between said member and said sprocket, a pawl and ratchet arranged to drive said assembly, means including a light responsive device operable to control the operation of said pawl and ratchet in accordance with the position of said film, and means including a perforated disk rotatable synchronously with said member for controlling the illumination of said light responsive device.

4. The combination of an intermittently rotatable member, a motion picture film driving sprocket, a picture framing mechanism interposed between said member and said sprocket, and means operable in response to an out-of-phase position of said film for controlling the operation of said framing mechanism.

5. The combination of a Geneva cross mechanism, a motion picture film driving sprocket, a picture framing mechanism interposed between said member and said sprocket, and means operable in response to an out-of-phase position of said film for controlling the operation of said framing mechanism.

FRANK E. RUNGE.